United States Patent

[11] 3,608,037

[72] Inventor Orville F. Genz
Elmwood Park, Ill.
[21] Appl. No. 844,006
[22] Filed July 23, 1969
[23] Division of Ser. No. 643,236,
June 2, 1967, Pat. No. 3,519,280
[45] Patented Sept. 21, 1971
[73] Assignee Hydro Component Research and
Development Co.
Chicago, Ill.

[54] METHOD FOR MAKING BEARING AND SEALING
MEANS OR THE LIKE
1 Claim, 6 Drawing Figs.
[52] U.S. Cl. .................................................. 264/161,
264/163, 264/328
[51] Int. Cl. ..................................................... B29f 1/14,
B29d 3/02
[50] Field of Search........................................... 264/325,
161, 163, 334

[56] References Cited
UNITED STATES PATENTS
2,408,629 10/1946 Green........................... 264/328 X
2,671,933 3/1954 Nye............................... 264/334 X
3,018,519 1/1962 Morin............................ 264/161 X
3,196,484 7/1965 Eyles............................. 264/161 X
3,523,991 8/1970 Tucker.......................... 264/163

Primary Examiner—Robert F. White
Assistant Examiner—Richard R. Kucia
Attorney—Hume, Clement, Hume & Lee ABSTRACT: A method is disclosed for making an annular sealing ring utilizing a two section mold mating along noncritical surface portions of the ring and having knockout pins projecting through complementary channels to communicate with the mold cavity for ejecting the molded ring on disassembly of the mold. A thermoplastic material is injected into the mold through gate means leading to at least one of the channels. When the material has solidified, the mold is disassembled by actuating the knockout pins to eject the molded member and shear the thermoplastic material communicating with the channel through the gate means. The portion of the molded part formed by the extension of the material into the complementary channels is then broken away leaving the completed part.

PATENTED SEP 21 1971 3,608,037
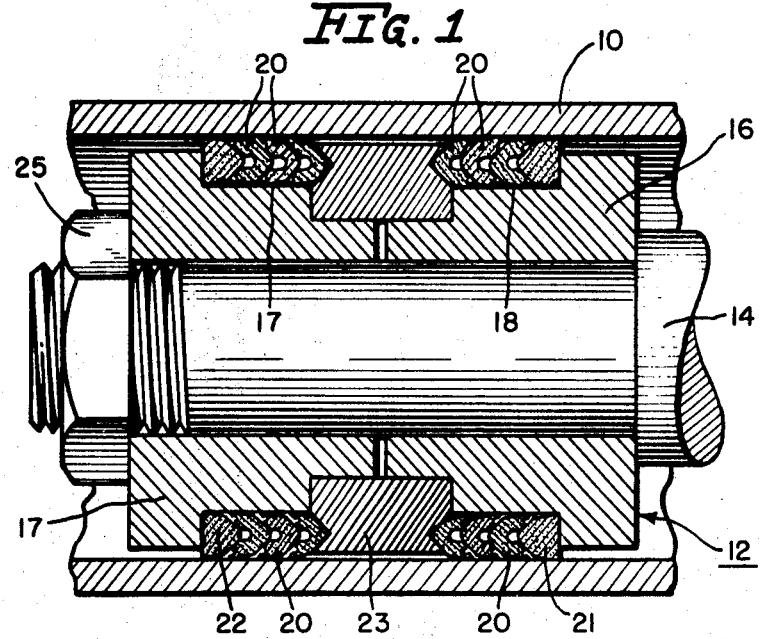
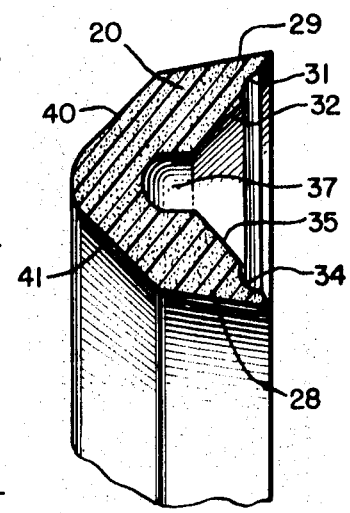
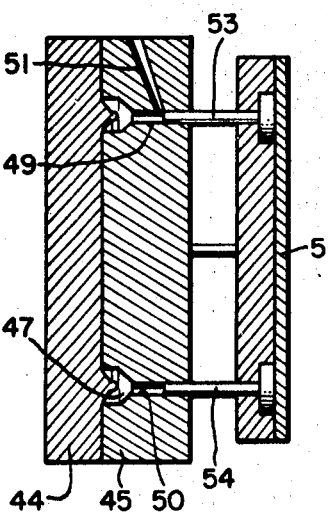
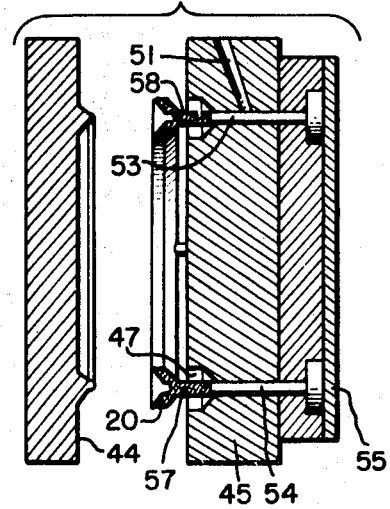
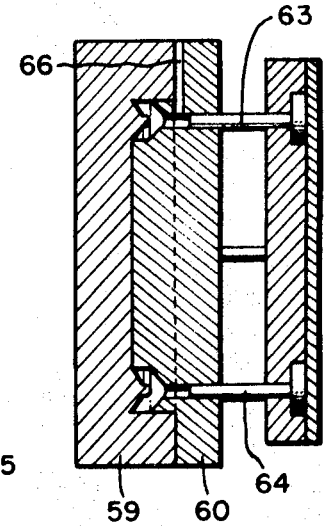
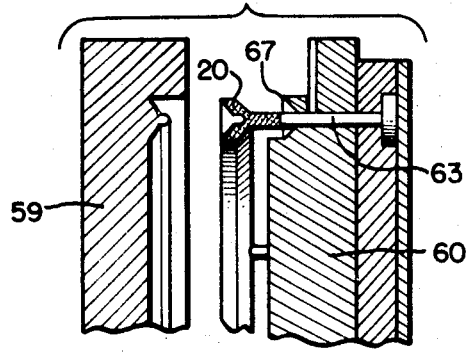
Inventor
Orville Ferdnand Genz
By Hume, Clement Hume & Lee
Attorneys 3,608,037

METHOD FOR MAKING BEARING AND SEALING MEANS OR THE LIKE

CROSS-REFERENCE TO RELATED APPLICATION

The present application is a division of application Ser. No. 643,236, filed June 2, 1967 entitled "Piston Bearing and Sealing Means" now U.S. Pat. No. 3,519,280, and assigned to the same assignee as the present invention.

INTRODUCTION

The present invention relates generally to hydraulic systems of the type including a cylinder and reciprocating piston assembly therefor and, more particularly, to molded bearing and sealing means for appropriately locating a piston in a cylinder. Specifically, the invention is directed to methods of making such bearing and sealing members.

BRIEF DESCRIPTION OF THE INVENTION

It is an object of the present invention to provide a new and improved method of making bearing and sealing rings for a piston assembly of a hydraulic cylinder system which rings are capable of functioning over a broad range of temperature and pressure conditions including extremely high temperatures and pressures.

It is another object of the present invention to provide a method of making a bearing and sealing member of a comparatively rigid thermoplastic material which member does not incur permanent deformation under extreme operating pressures at high temperature conditions yet which is so constructed as to provide a reliable seal and bearing surface at modest operating pressure and temperature conditions.

It is yet another object of the present invention to provide a new and improved method of making a molded bearing and sealing member which assures that certain surface portions of the member have the required high degree of smoothness without the necessity of time consuming and expensive grinding and polishing operations subsequent to molding.

It is a further object of the present invention to provide a simplified method of making a bearing and sealing means of a reinforced thermoplastic material by an injection molding technique.

In accordance with the method of the invention, there is provided a two section mold with the sections being adapted to mate along noncritical surface portions of the bearing and sealing member. Knockout pins project through complementary channels in one of the mold sections and communicate with the mold cavity at the base of the V for ejecting the molded ring on disassembly of the mold. Specifically, the method contemplates injecting a fluid state thermoplastic material carrying randomly oriented fibers into the mold only through gate means which leads to at least one of the channels. The thermoplastic material is allowed to solidify and the mold is then disassembled and the knockout pins actuated to eject the molded member therefrom while also shearing the thermoplastic material communicating with the channel through the gate means. The manufacture is completed by breaking off that portion of the molded part formed by extension of the material into the channels.

BRIEF DESCRIPTION OF THE DRAWINGS

The features of the present invention which are believed to be novel are set forth with particularity in the appended claims. The invention together with further objects and advantages thereof may best be understood, however, with reference to the following description taken in connection with the accompanying drawings in the several figures of which like reference numerals identify like elements and in which:

FIG. 1 is a cross-sectional view of a piston assembly and cylinder embodying the combination bearing and sealing means made by the method of the invention;

FIG. 2 is an enlarged, cross-sectional view of a single bearing and sealing member of FIG. 1;

FIGS. 3a and 3b are cross-sectional views of a preferred mold construction of the invention illustrated in respectively an assembled and a disassembled condition;

FIGS. 4a and 4b are similar to the views of FIG. 3 but illustrate an alternate embodiment of the mold construction.

DESCRIPTION OF THE PREFERRED EMBODIMENT

Referring now to FIG. 1, there is shown a portion of a hydraulic system comprising a hollow metal cylinder section 10 which normally carries a hydraulic fluid (not shown), such as oil or the like. A piston assembly 12 is located in the cylinder with portions thereof contiguous the interior cylinder wall and is adapted for reciprocating movement therein under the driving influences of fluid pressure also transmitting movement to the piston rod 14. The complete structure is not illustrated as such hydraulic piston and cylinder assemblies are generally well known to the art; these assemblies find utility in fluid motors of diverse types, such as employed on trucks, tractors, and lifting devices.

Piston assembly 12 comprises a pair of similar body members 16 and 17 which, for high pressure and temperature applications, are preferably formed of a metal such as steel. Body members 16 and 17 are disposed in opposed relationship in the cylinder and are provided with coaxial central apertures for receiving the upper end of piston rod 14. Members 16 and 17 have an outer diameter somewhat less than that of cylinder 10 to avoid frictional engagement therewith; piston assembly 12 is supported within the cylinder by a combination molded bearing ans sealing means which is carried on similar reduced diameter sleeve portions 18 and 19 of the body members. This bearing and sealing means comprises a plurality of annular ring members 20 which are of a generally V-shaped or chevron-like cross section. Three such annular ring members 20 are seated in a nested relationship on each of sleeve portions 18 and 19 with the outermost rings 21 and 22 of each series having a flat surface for mating with a shoulder flange of body members 16 and 17, respectively. The outer surfaces of opposite legs of each V-shaped member contact respectively the cylinder wall and an associated sleeve portion of the piston body members. The V-shaped members are all pointed inwardly toward an annular adapter flange 23 which flange spans a second stepped or reduced diameter section of each body member to retain the body members in coaxial alignment with a slight axial spacing therebetween. The innermost V-rings are received in complementary annular receiving channels disposed on opposite faces of adapter 23. Again, for high pressure applications, adapter 23 is preferably formed of metal such as bronze, although in certain applications this member may be formed of the same thermoplastic material as are the V-shaped bearing members 20.

Piston assembly 12 is retained in an assembled relationship by piston rod 14 having a stepped shoulder section which is received in a complementary cavity of body portion 18 and a threaded end segment for receiving a securing nut 25. Tightening of nut 25 effects a compression of members 20 between their respective body portions and the adapter flange. It will be understood that piston assembly 12 is guided within the cylinder solely by rings 20, 21 and 22 which also provide the seal between the piston assembly and the cylinder walls as is necessary to avoid loss of hydraulic fluid and pressure from the closed system. Rings 20, 21, and 22 must, of course, be of a composition and smoothness to provide the foregoing results without scoring or otherwise damaging the cylinder walls and further must be of a sufficient tensile strength so as not to be extruded or permanently deformed upon application of extreme surge pressures often exceeding 8,000 lbs. per square inch or temperatures in excess of 200° F. Of course, it is also preferred that the bearing and sealing means be of a construction which is relatively simple and economical to construct.

The combination molded bearing and sealing means 20 is composed of a relatively rigid molded thermoplastic material reinforced with randomly oriented fibers, preferably glass fibers, and is of a material species for withstanding high operating temperatures and pressures. It has been found, for example, that nylon, polycarbonate, polyurethane and an acetal resin available from the Dupont Corporation under the trademark "Delrin" are satisfactory for the present application when reinforced with the above mentioned fibers. The rigidity of the materials and the high pressure and high temperature operating environments have posed serious problems with regard to sealing and cracking of prior art bearing and sealing constructions. The difficulties are cured by the unique configuration of the present invention which is shown in detail in FIG. 2. Specifically, member 20 comprises an annular ring of a generally V-shaped cross section having exterior faces 28 and 29 of opposite legs of the V adapted to contact respectively the piston and the cylinder. Preferably, these face portions have a slight taper forming an angle of four or five degrees with the horizontal. To counteract the extreme stiffness of this material especially at law operating temperatures and pressures, there is provided an annular groove 31 near the extremity of the interior face 32 of the leg which contacts the cylinder. Groove 31 provides a hinge point to increase the flexibility of the leg extremity and thereby effect an improved seal especially at low pressure and temperature conditions. An annular groove 34 of like symmetry and location to that of groove 31 is provided in the opposite face of the member. Both of the annular grooves 31 and 34 are preferably positioned approximately 70 percent or more of the way from the base of the V to the extremities of the respective legs thereof.

Member 20 is also provided with a groove 37 of arcuate cross section of the crotch of the V to increase the flex or hinge action of the legs in their entirety over that of a simple V configuration. Also, to provide a clearance to allow flexing of the members 20 when stacked in a nested relationship, the included angle between the interior faces 32 and 35 of member 20 is made materially greater than the included angle between exterior face portions 40 and 41 of the member. Specifically, the included angle between the interior faces is preferably about 110° while the included angle between exterior faces 40, 41 is approximately 90°. It has been found that the foregoing measure prevents cracking of the members incident to extremes in environmental pressures.

By way of example, one ring configuration adapted for mounting on a piston sleeve of 3.5 inches in diameter and found satisfactory in actual operation was constructed with a maximum cross-sectional dimension between the leg tips of between 0.257 and 0.265 inches and was provided with leg sections 28 and 29 of approximately 0.110 inches in length tapered toward the base of the V at an angle of four to five degrees. The distance between the lower tips of leg portions 28 and 29 in this construction is between 0.236 and 0.242 inches; the plotted extensions of lower leg segments 40 and 41 intersect to form an included angle of approximately 90° although in fact the intersection of these legs takes the form of an arcuate segment of a 0.0625-inch radius. Annular groove 37 is a straight sided trench or groove having an arcuate base of a 0.13-inch radius drawn from the projected intersection of interior faces 32 and 35. Grooves 31 and 34 are similar and are less than semicircular segments of 0.015-inch radius.

There is also provided a mold construction which permits a simple and economical manner of forming rings 20 by an injection molding technique and which mold assures that exterior face portions 28 and 29 of ring 20 will have the required high degree of smoothness for effecting suitable seals with respectively the cylinder and piston assemblies. A preferred old construction is illustrated in FIG. 3 and comprises first and second mating mold sections 44 and 45 which define in an assembled relation, as seen in FIG. 3a, a mold cavity 47 conforming in outline to member 20. As seen in the drawing, the mating surfaces of the mold sections define an interface which does not intersect the outer surface portions 28 and 29 of member 20. Specifically, the interface is primarily formed by a plane tangent to the uppermost extentions of member 20. By virtue of the present construction, objectionable mold parting lines on surfaces of the molded part are obviated and machining or polishing of the part to obtain the necessary smoothness is rendered unnecessary.

Second mold section 45 is provided with a series of channels such as 49 and 50 which extend from the back side of this mold section to communicate with the mold cavity at the base of the V. A submerged gate 51 in mold section 45 communicates with at least one of the channels, such as 49, and extends to the outer surface of the mold to connect to a runner from a conventional injection molding machine (not shown).

A series of knockout pins 53 and 54 are each normally positioned at an end of a corresponding channel which is remote from the mold cavity; knockout pins 53 and 54 form fluidtight seals with their corresponding channels and are capable of concurrent actuation by virtue of a knockout plate 55. As thus seen in FIG. 3b, movement of plate 55 towards the mold forces the knockout pins forward in unison to close gate passage 51 and also move the pins adjacent the base of the mold cavity.

Application of the described mold assembly to making of a ring member can best be understood by reference to the method of the present invention. Specifically, mold sections 44 and 45 are assembled in mated relation as shown in FIG. 3a and the several knockout pins are positioned at remote ends of their respective channels. A reinforced thermoplastic material in a liquid state, which may be of any of the compositions herein before described or equivalents thereof, is injected into the mold cavity under pressure through submerged gate 51 via a runner which is coupled to a conventional injection molding machine (not shown). After the material has been allowed to cool and solidify, the mold is disassembled by removing cover section 45 and and actuating the knockout pins in unison by movement of plate 55 towards the mold. This action shears the thermoplastic material communicating with the channel through the gate 51 as well as ejecting the part from the mold. The leg portion 57 and 58 which extend from the base of the ring 20 are removed from the part by merely breaking or snapping them off since the material is relatively thin at this point and is fairly rigid. This lower or base portion of the V is entirely uncritical to performance of the part as this portion of the member does not constitute either a bearing or sealing surface; rather the base of the V sits in the open area of a hinge groove 37 of an adjacent ring. Injection of the material into the mold at base of the V and the described cooperating channels not only simplify manufacturing procedure but also avoid objectionable flash marks on the part at critical surface areas.

An alternate construction of the mold assembly is shown in FIG. 4. This embodiment likewise comprises first and second mold sections 59 and 60, respectively, with the second mold section having channels in which are seated knockout pins 63 and 64. In this embodiment, a gate 66 enters a channel along a horizontal path formed by a shallow depression in mold section 60 and the flat mating surface of section 59. Gate 66 likewise communicates with the mold cavity at the V base through at least one of the channels.

From a comparison of the present mold construction with that of FIG. 3, it will be noted that they also differ in the location of the interface between the two sections. Although both constructions avoid having the interface intersect any critical surface portion of the ring member, the construction of FIG. 4b is not preferred because a sharp edge portion 67 on mold section 60 is somewhat fragile.

While a particular embodiment of the present invention has been shown and described, it is apparent that various changes and modifications may be made, and it is therefore intended in the following claims to cover all such modifications and changes as may fall within the true spirit and scope of this invention.

I claim:

1. The method of making an annular sealing ring of a generally V-shaped cross section for a piston assembly of a hydraulic cylinder system utilizing a two-section mold mating along noncritical surfaces portions of said ring and having knockout pins projecting through complementary channels in one of said mold sections to communicate with the mold cavity at the base of said V for ejecting said molded ring member on disassembly of said mold, said method comprising the steps of:

injecting a fluid state thermoplastic material carrying randomly oriented fibers into said mold only through gate means leading to at least one of said channels;

allowing said material to solidify;

disassembling said mold and actuating said knockout pins to eject said molded member and shear said thermoplastic material communicating with said channel through said gate means;

and breaking off the portion of said molded part formed by extension of said material into said complementary channels.